(12) United States Patent
    Diaz

(10) Patent No.: US 10,654,579 B2
(45) Date of Patent: May 19, 2020

(54) COOLED COOLING AIR SYSTEM FOR A GAS TURBINE

(71) Applicant: General Electric Company, Schenectady, NY (US)

(72) Inventor: Carlos Enrique Diaz, Munich (DE)

(73) Assignee: GENERAL ELECTRIC COMPANY GLOBAL RESEARCH, Niskayuna, NY (US)

( * ) Notice: Subject to any disclaimer, the term of this patent is extended or adjusted under 35 U.S.C. 154(b) by 770 days.

(21) Appl. No.: 15/209,880

(22) Filed: Jul. 14, 2016

(65) Prior Publication Data

US 2016/0318619 A1    Nov. 3, 2016

Related U.S. Application Data

(62) Division of application No. 13/907,187, filed on May 31, 2013, now Pat. No. 9,422,063.

(51) Int. Cl.

| | | |
|---|---|---|
| *B64D 33/10* | (2006.01) | |
| *F02C 7/141* | (2006.01) | |
| *F02C 3/04* | (2006.01) | |
| *F02C 7/18* | (2006.01) | |
| *B64D 33/02* | (2006.01) | |
| *F02K 3/115* | (2006.01) | |
| *B64D 29/00* | (2006.01) | |
| *F01D 25/24* | (2006.01) | |

(52) U.S. Cl.
CPC ............ *B64D 33/10* (2013.01); *B64D 29/00* (2013.01); *F01D 25/24* (2013.01); *F02C 3/04* (2013.01); *F02C 7/141* (2013.01); *F02C 7/18* (2013.01); *F02K 3/115* (2013.01); *B64D 2033/024* (2013.01); *F05D 2220/32* (2013.01); *F05D 2260/213* (2013.01); *Y02T 50/672* (2013.01); *Y02T 50/675* (2013.01)

(58) Field of Classification Search
CPC ... B64D 33/10; F02C 7/16; F02C 7/18; F02C 7/185; F02C 6/08
See application file for complete search history.

(56) References Cited

U.S. PATENT DOCUMENTS

| | | | | |
|---|---|---|---|---|
| 3,651,645 | A * | 3/1972 | Grieb ..................... | F02C 7/14 60/262 |
| 7,000,404 | B2 * | 2/2006 | Palmisano ............. | F01D 25/12 60/728 |
| 7,900,437 | B2 * | 3/2011 | Venkataramani ........ | F01D 9/06 244/134 R |

(Continued)

*Primary Examiner* — Carlos A Rivera
(74) *Attorney, Agent, or Firm* — The Small Patent Law Group LLC; Jason P. Gross

(57) ABSTRACT

In an aircraft including a gas turbine engine having a compressor including a compressor booster, a turbine, and a nacelle, a system for cooling compressor discharge air provided to the turbine to cool the turbine includes a heat exchanger provided in a nacelle compartment of the gas turbine engine configured to cool the compressor discharge air by exchanging heat from the compressor discharge air to a cooling fluid; and a cooling fluid circuit configured to circulate cooling fluid through the heat exchanger and a heat sink, wherein the heat sink is at least one of an inlet of the nacelle compartment, an inlet of the compressor booster, or outlet guide vanes of the gas turbine engine.

19 Claims, 10 Drawing Sheets

(56) References Cited

U.S. PATENT DOCUMENTS

2011/0162387 A1* 7/2011 Chir .................. F01D 5/081
  60/806
2012/0067055 A1* 3/2012 Held .................. F02C 7/12
  60/772

* cited by examiner

COOLED COOLING AIR SYSTEM FOR A GAS TURBINE

BACKGROUND OF THE TECHNOLOGY

The present technology relates generally to a cooling system and method for a gas turbine engine and, in particular, to a system and method of cooling a hot portion of a gas turbine engine.

Gas turbine engines (such as turbojet engines, bypass turbofan engines, turboprop engines, turboshaft engines, etc.) may be used to power flight vehicles (such as planes, helicopters, and missiles, etc.) and may also be used to power ships tanks, electric power generators, pipeline pumping apparatus, etc. For purposes of illustration, the present technology will be described with respect to an aircraft bypass turbofan gas turbine engine. However, it is understood that the present technology is equally applicable to other types and/or uses of gas turbine engines.

Referring to FIG. 9, a gas turbine engine assembly 10 includes a core engine 15 having, in serial flow relationship, a high pressure compressor 18 (also called a core compressor) to compress the airflow entering the core engine 15, a combustor 20 (also called a combustion chamber) in which a mixture of fuel and the compressed air is burned to generate a propulsive gas flow, and a high pressure turbine 22 which is rotated by the propulsive gas flow and which is connected by a larger diameter shaft to drive the high pressure compressor 18. A typical aircraft bypass gas turbine engine adds a low pressure turbine 24 (located aft of the high pressure turbine) which is connected by a smaller diameter coaxial shaft to drive a front fan 14 (located forward of the high pressure compressor) which is surrounded by a nacelle 32 and which may also drive a low pressure compressor 16 (located between the front fan 14 and the high pressure compressor 18). The low pressure compressor 16 sometimes is called a booster compressor or simply a booster. It is understood that the term "compressor" includes, without limitation, high pressure compressors and low pressure compressors. A flow splitter 17, located between the fan 14 and the first (usually the low pressure) compressor, separates the air which exits the fan 14 into a core engine airflow and a surrounding bypass airflow. The bypass airflow from the fan exits the fan bypass duct 40 to provide most of the engine thrust for the aircraft. Some of the engine thrust comes from the core engine airflow after it flows through the low and high pressure compressors 16, 18 to the combustor 20 and is expanded through the high and low pressure turbines 22, 24 and accelerated out of the exhaust nozzle.

Aircraft bypass turbofan gas turbine engines are designed to operate at high temperatures to maximize engine thrust. Cooling of engine hot section components (such as the combustor, the high pressure turbine, the low pressure turbine, and the like) is necessary because of the thermal "redline" limitations of the materials used in the construction of such components. Typically, such cooling of a portion of the engine is accomplished by ducting (also called "bleeding") cooler air from the high and/or low pressure compressors to those engine components which require such cooling. Unfortunately, the relatively low pressure and hot temperature of the compressor air limits its ability to be used to cool such engine components.

In service, gas turbine aircraft engines are subject to a wide range of operating conditions such as high and low altitudes, high and low temperatures, and high and low speed airflows over, around, and through the engine. Even during a single flight, the aircraft, its engine(s), and engine control components may experience low speed, low altitude, and high temperature conditions during taxi, takeoff, and landing operations, as well as high speed, high altitude, and low temperature conditions during the cruise portion of the flight.

To manage the operating temperatures of the engine components, ventilation is often provided to direct air which is cooler than the components onto the components to carry heat away and maintain the temperature of the component at a satisfactory operating level. However, cooling needs often vary greatly during the course of a flight or operating session. For example, a much greater degree of cooling may be needed on a hot day during ground operations at engine idle power settings than at high altitude during cruise conditions and high power settings.

The technology described herein relates generally to gas turbine engines, and more particularly, to a system and method for cooling engine control components for such engines.

BRIEF DESCRIPTION OF THE TECHNOLOGY

In one example of the present technology, in an aircraft including a gas turbine engine having a compressor including a compressor booster, a turbine, and a nacelle, a system for cooling compressor discharge air provided to the turbine to cool the turbine comprises a heat exchanger provided in a nacelle compartment of the gas turbine engine configured to cool the compressor discharge air by exchanging heat from the compressor discharge air to a cooling fluid; and a cooling fluid circuit configured to circulate cooling fluid through the heat exchanger and a heat sink, wherein the heat sink is at least one of an inlet of the nacelle compartment, an inlet of the compressor booster, or outlet guide vanes of the gas turbine engine.

In another example of the present technology, a method of cooling compressor discharge air provided to a turbine of a gas turbine engine of an aircraft having a compressor including a compressor booster, a turbine, and a nacelle, to cool the turbine, comprises circulating a cooling fluid through a heat exchanger and a heat sink, wherein the heat sink is at least one of an inlet of a compartment of the nacelle, an inlet of the compressor booster, the nacelle internal fixed structure (IFS), the nacelle aft core cowl (ACC), the thrust reverser outer fixed structure (OFS), the nacelle external cowl or outlet guide vanes of the gas turbine engine; and exchanging heat in the heat exchanger from the compressor discharge air to the cooling fluid to cool the compressor discharge air.

BRIEF DESCRIPTION OF THE DRAWINGS

Examples of the present technology will be described with regard to the accompanying drawing figures, in which like numerals refer to like elements throughout the drawing figures, wherein.

DETAILED DESCRIPTION OF THE TECHNOLOGY

Figure 1:
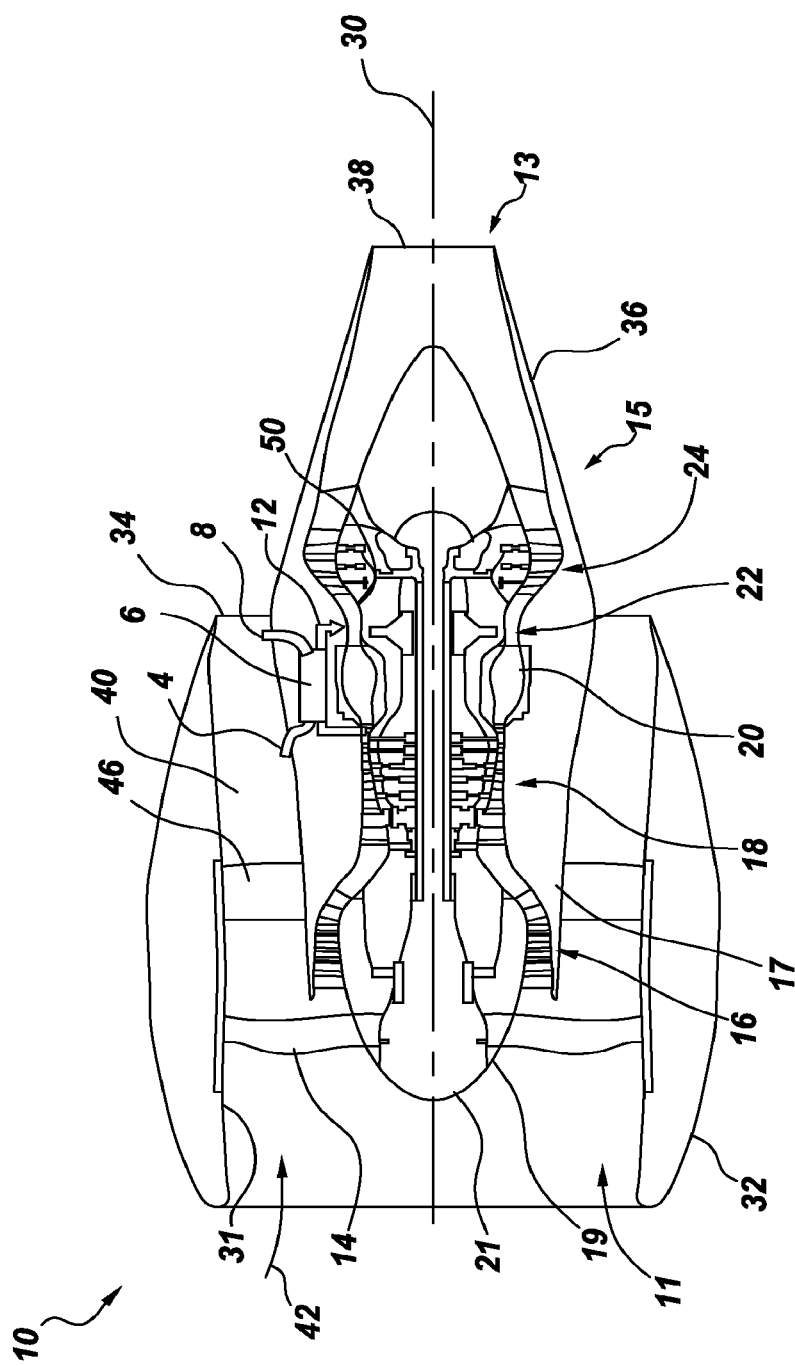
FIG. 1 is a cross-sectional illustration of a gas turbine engine with convectional cooled cooling air assembly.

FIG. 1 is a cross-sectional schematic illustration of a cooling system for a gas turbine engine with convectional cool cooling air by means of an air/air heat exchanger assembly 10 having a longitudinal axis 30. The gas turbine engine assembly 10 includes a fan assembly 14 and a core gas turbine engine 15. The core gas turbine engine 15 includes a high pressure compressor 18, a combustor 20, and a high pressure turbine 22. The gas turbine engine assembly 10 may further include a low pressure turbine 24, and a multi-stage low pressure, or booster, compressor 16 (also referred to as a booster), and a splitter 17 that substantially circumscribes or encircles booster 16. The gas turbine engine assembly 10 has an intake side 11 and an exhaust side 13.

The fan assembly 14 includes an array of fan blades extending radially outward from a rotor disk 19, the forward portion of which is enclosed by a streamlined spinner 21. The fan assembly 14, the booster 16, and the low pressure turbine 24 may be coupled together by a first rotor shaft and the high pressure compressor 18 and the high pressure turbine 22 may be coupled together by a second rotor shaft.

In operation, incoming air 42 flows through fan assembly 14 and a first portion of the airflow is channeled through booster 16 and onward through internal flowpath 50 of core gas turbine engine 15. The compressed air that is discharged from booster 16 is channeled through high pressure compressor 18 wherein the airflow is further compressed and delivered to the combustor 20. Hot products of combustion (not shown in FIG. 1) from the combustor 20 drive the high pressure turbine 22 and the low pressure turbine 24, and the low pressure turbine 24 drives the fan assembly 14 and the booster 16 by way of the first rotor shaft. Air and combustion products flowing through internal flowpath 50 exit the core gas turbine engine 15 at the trailing edge 38 of the core cowl 36. The turbine engine assembly 10 may be operable at a range of operating conditions between design operating conditions and off-design operating conditions.

A second portion of the incoming airflow 42 discharged from the fan assembly 14 is channeled through a bypass duct 40 to bypass a portion of the airflow from fan assembly 14 around the core cowl 36 which encloses the core gas turbine engine 15. More specifically, the bypass duct 40 extends between a fan casing or shroud, which forms a first or inner surface 31 of an engine nacelle 32 and the core cowl 36 which has a leading edge formed by the splitter 17. Air flowing through bypass duct 40 exits the trailing edge 34 of the nacelle 32. The nacelle 32 encloses the major portion of the aircraft engine 10 and is secured to the aircraft by appropriate mounting apparatus, such as a mounting pylon 2 (FIG. 2).

Accordingly, a first portion of the airflow from fan assembly 14 is channeled through booster 16 and then into the high pressure compressor 18 as described above, and a second portion of the airflow from fan assembly 14 is channeled through the bypass duct 40 to provide thrust for the aircraft. The splitter 17 divides the incoming airflow into the first and second portions. The gas turbine engine assembly 10 also includes a fan frame assembly 46 to provide structural support for fan assembly 14 and is also utilized to couple fan assembly 14 to the core gas turbine engine 15.

The bypass duct 40 may include a scoop 4 configured to direct air from the bypass duct 40 to a heat exchanger 6. The heat exchanger uses the air from the bypass duct 40 to cool air 12 received from a discharge region of the high pressure compressor 18 that is used to first stage of the high pressure turbine 22. It can be used to cool any other hot part, like the disk of the high pressure compressor. An exhaust 8 is provided to return the cooling air to the bypass duct 40. The provision of the scoop in the bypass duct and the return of the air to the bypass duct through the exhaust typically causes increased drag on the aircraft during cruise conditions. Moreover, the heat is dissipated in the propulsion system and is transferred by air-to-air, which provides poor efficiency, requires large heat exchangers, and adds drag on the aircraft.

Figure 2:
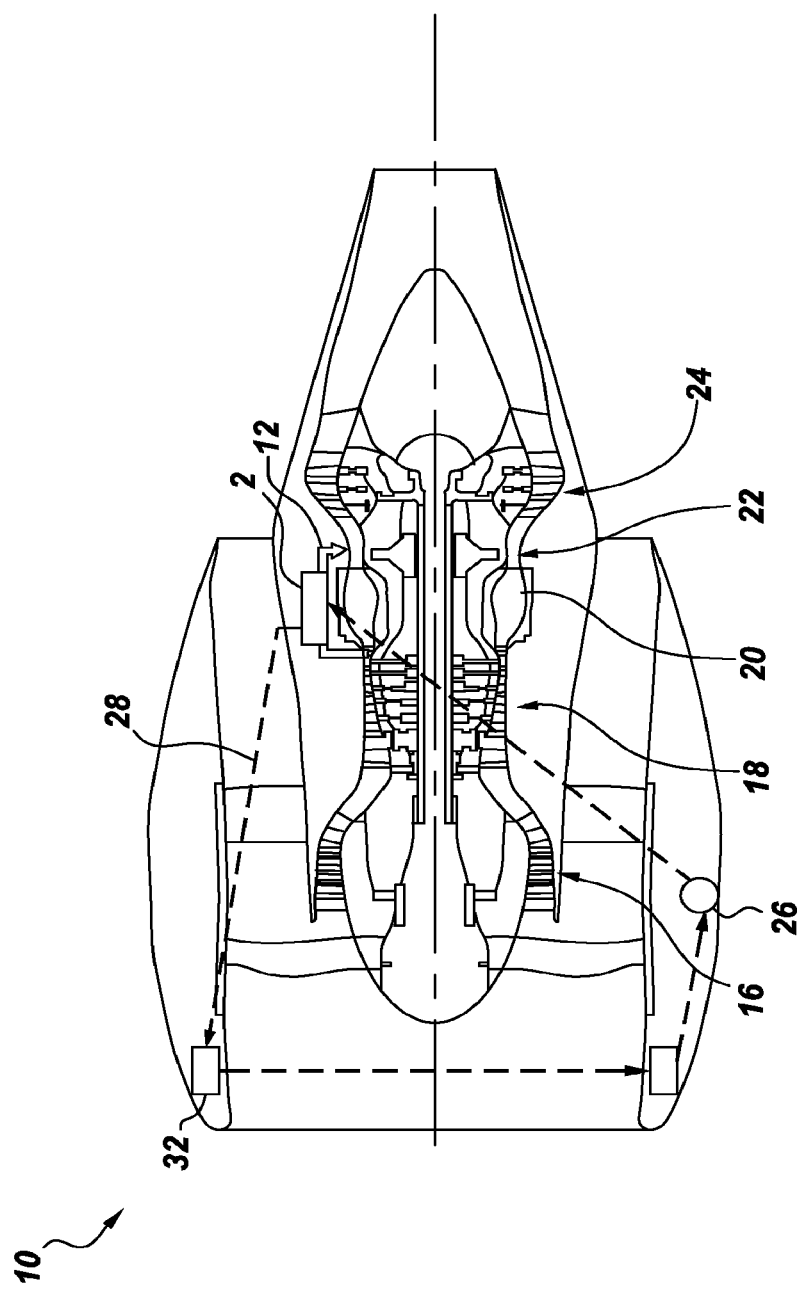
FIG. 2 is a cross-sectional illustration of an example of a cooling system for a gas turbine engine assembly according to the present technology.

Referring to FIG. 2, a cooling system for a gas turbine engine assembly 10 according to one example of the present technology may include a heat exchanger, for example an evaporator, 2 configured to cool the compressor bleed air 12 with a cooling fluid 28. The cooling fluid 28 is put through a Rankine cycle during take-off and climb, and optionally during de-icing, and is routed through the gas turbine engine assembly 10 as shown schematically in the figure. The cooling fluid 28 is cooled at the nacelle air inlet 32, and is delivered back to the heat exchanger 2 by a pump 26 to cool the compressor bleed air 12.

The cooling fluid 28 may be a liquid that changes phases during the Rankine cycle. In that case, the nacelle air inlet 32 acts as a condenser, and the cooling fluid 28, in its gaseous phase prior to condensation, may be used as a de-icing system in the engine nacelle. Although the cooling fluid 28 may be a liquid that changes phases, it should also be appreciated that a cooling fluid that does not undergo a phase change may be used, for example polyalphaolefin, or water with glycol or ammonia. Furthermore, it should be appreciated that the cooling fluid 28 may be pumped through the heat exchanger 2 at a flow rate sufficient to prevent the cooling fluid 28 from changing phase as it is heated by the compressor bleed air 12.

Figure 3:
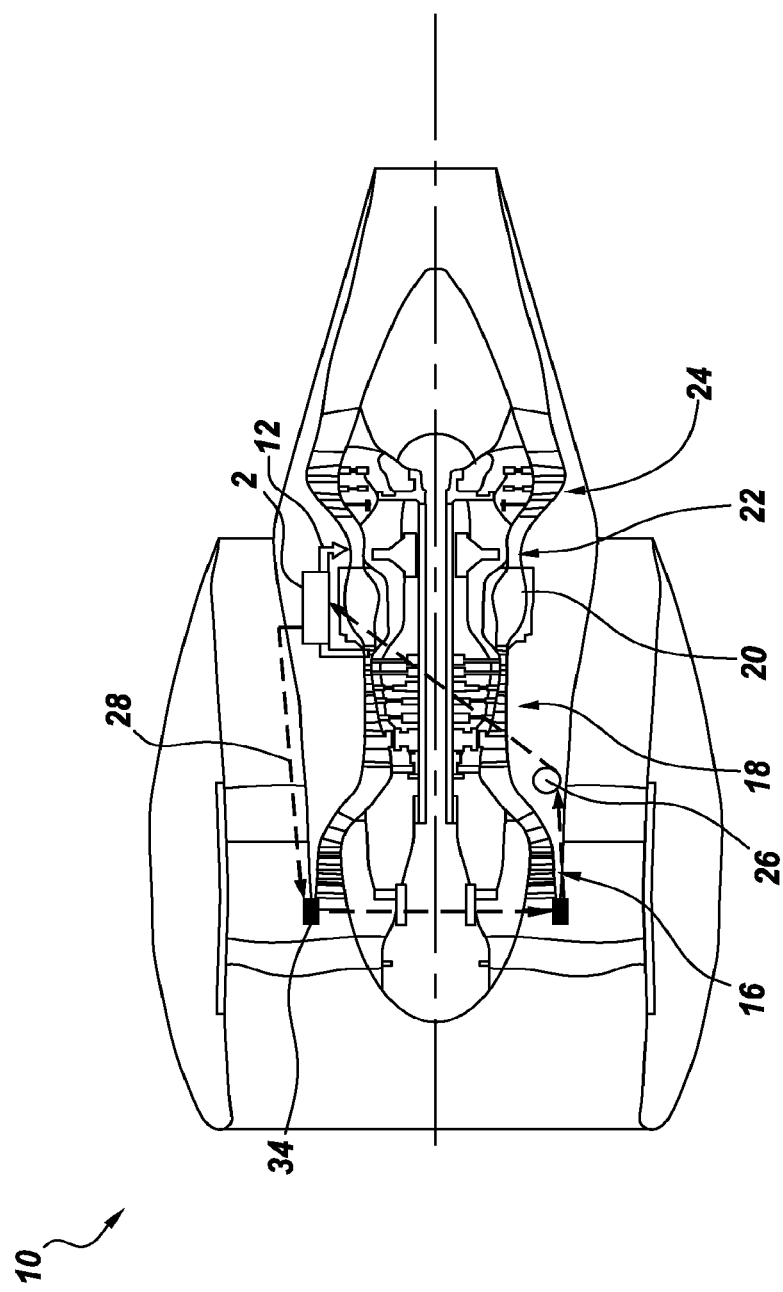
FIG. 3 is a cross-sectional illustration of an example of a cooling system for a gas turbine engine assembly according to the present technology.

Referring to FIG. 3, a cooling system according to another example of the present technology utilizes the booster compressor air inlet 34 of the low pressure, or booster, compressor 16 as a condenser. The cooling fluid 28 is put through a Rankine cycle and is provided by a pump 26 to a heat exchanger, or evaporator, 2 that cools the compressor bleed air 12. The cooling fluid 28 may be a fluid that undergoes a phase change, i.e. turns to vapor, through the heat exchanger 2, as discussed above with respect to FIG. 2. Similarly, the cooling fluid 28 may be a fluid that does not undergo a phase change, such as polyalphaolefin, or water with glycol or ammonia. The booster inlet 34 acts as a condenser and may provide de-icing protection for the gas turbine engine assembly 10 in the splitter area.

Figure 4A:
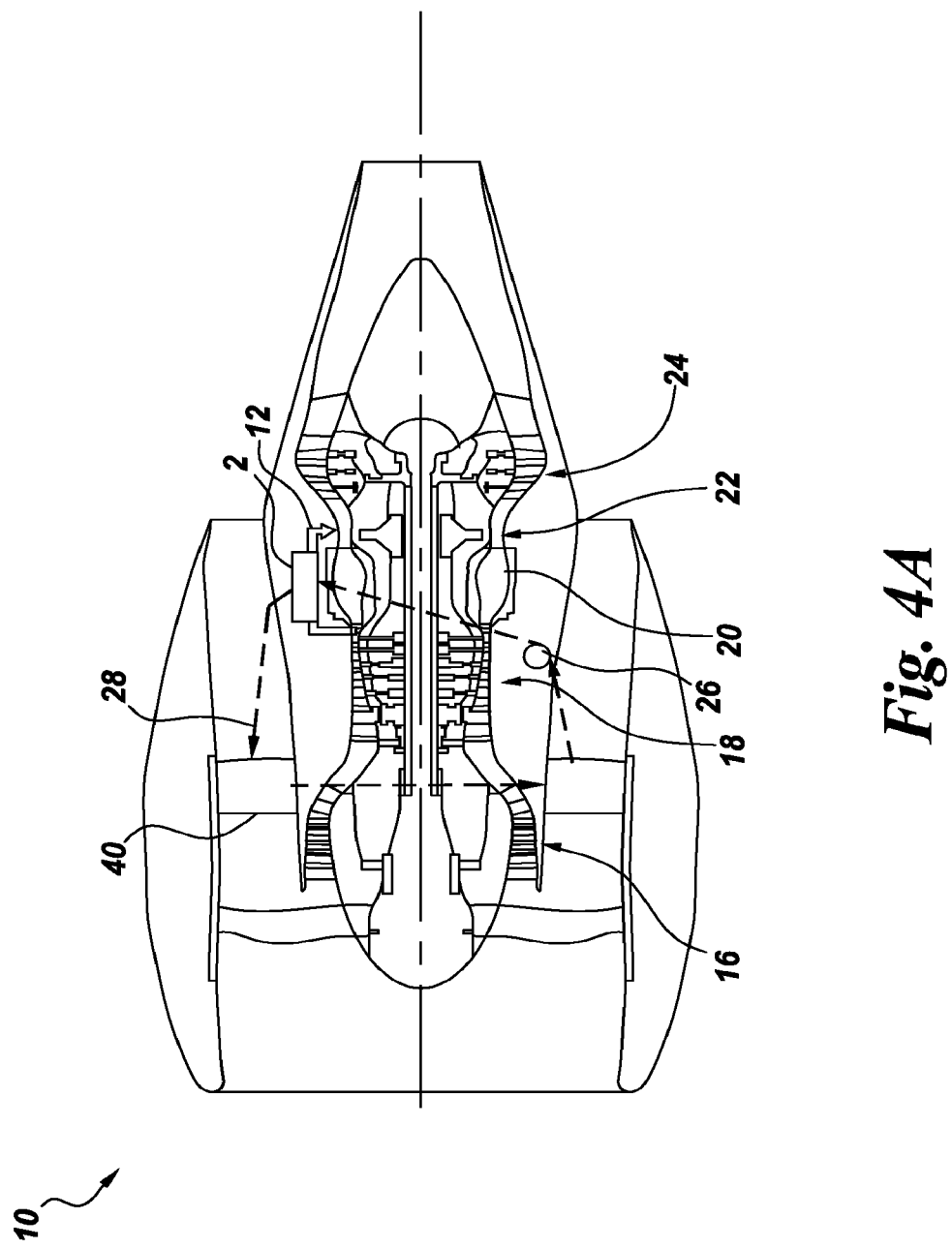
FIG. 4A is a cross-sectional illustration of an example of a cooling system for a gas turbine engine assembly according to the present technology.

Referring to FIG. 4A, a cooling system according to another example of the present technology utilizes the outlet guide vanes 40 of the gas turbine engine assembly 10 as a condenser. The cooling fluid 28 is put through a Rankine cycle and is provided by a pump 26 to a heat exchanger, or evaporator, 2 that cools the compressor bleed air 12. The cooling fluid 28 may be a fluid that undergoes a phase change, i.e. turns to vapor, through the heat exchanger 2, as discussed above with respect to FIGS. 2 and 3. As also discussed above with respect to FIGS. 2 and 3, it should be appreciated that the cooling fluid 28 may be a fluid that does not undergo a phase change, such as polyalphaolefin, or water with glycol or ammonia.

Figure 4B:
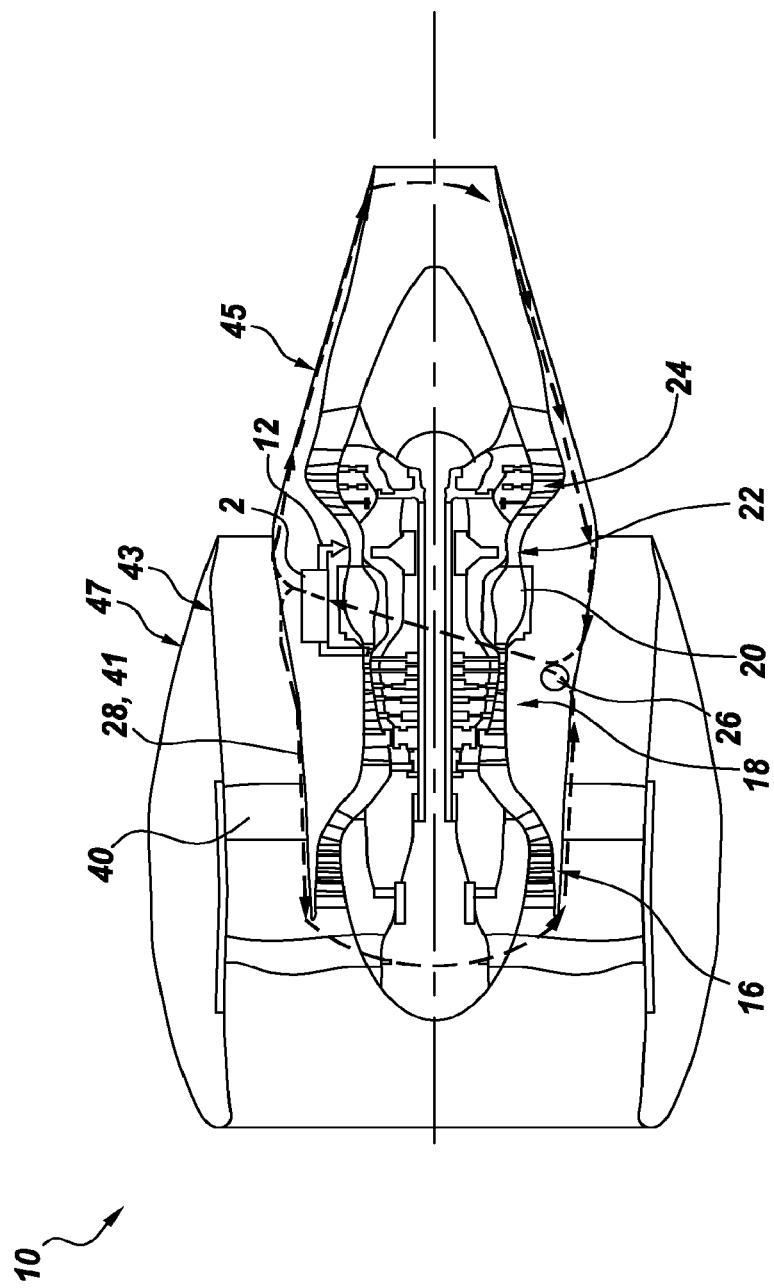
FIG. 4B is a cross-sectional illustration of an example of a cooling system for a gas turbine engine assembly according to the present technology.

Referring to FIG. 4B, a cooling system according to another example of the present technology utilizes the nacelle internal fixed structure 41 or the nacelle aft core cowl 42 of the gas turbine engine assembly 10 as a condenser This will be possible is these surfaces are metallic (e.g. aluminum) or made with a high temperature resistance composite material (e.g. Titanium honeycomb with high temperature capable resin). Surfaces in the nacelle Outer fixed structure 43 around the fan duct or the external cowl of the nacelle 44 can be also used. All these surfaces could be used to exchange heat as a lean surface or with the help of high performance fluid/air heat exchangers like surface coolers. The cooling fluid 28 is put through a Rankine cycle and is provided by a pump 26 to a heat exchanger, or evaporator, 2 that cools the compressor bleed air 12. The cooling fluid 28 may be a fluid that undergoes a phase change, i.e. turns to vapor, through the heat exchanger 2, as discussed above with respect to FIGS. 2 and 3. As also discussed above with respect to FIGS. 2 and 3, it should be appreciated that the cooling fluid 28 may be a fluid that does not undergo a phase change, such as polyalphaolefin, or water with glycol or ammonia.

In order to reduce the mass flow of the cooling fluid 28, the heat exchanger 2 may be operated as an evaporator to change the phase of the cooling fluid 28 from liquid to vapor. Most of the enthalpy gain in the cooling fluid is thus used to change the phase, and not the temperature, of the cooling fluid. This would allow the size of the evaporator to be reduced. The vapor is then sent to a heat sink where the phase is changed back to liquid in a second heat exchanger that will work as a condenser (e.g. the nacelle air inlet, the booster air inlet, the nacelle internal fixed structure (IFS) 41, the nacelle aft core cowl (ACC) 45, the thrust reverser outer fixed structure (OFS) 43, the nacelle external cowl 47 and/or the outlet guide vanes 40). The condenser will be cooled by external cooling air and/or ice around the condenser in the nacelle inlet compartment, the condenser in the compressor booster inlet, and/or the condenser in the outlet guide vanes of the fan duct.

Figure 5:
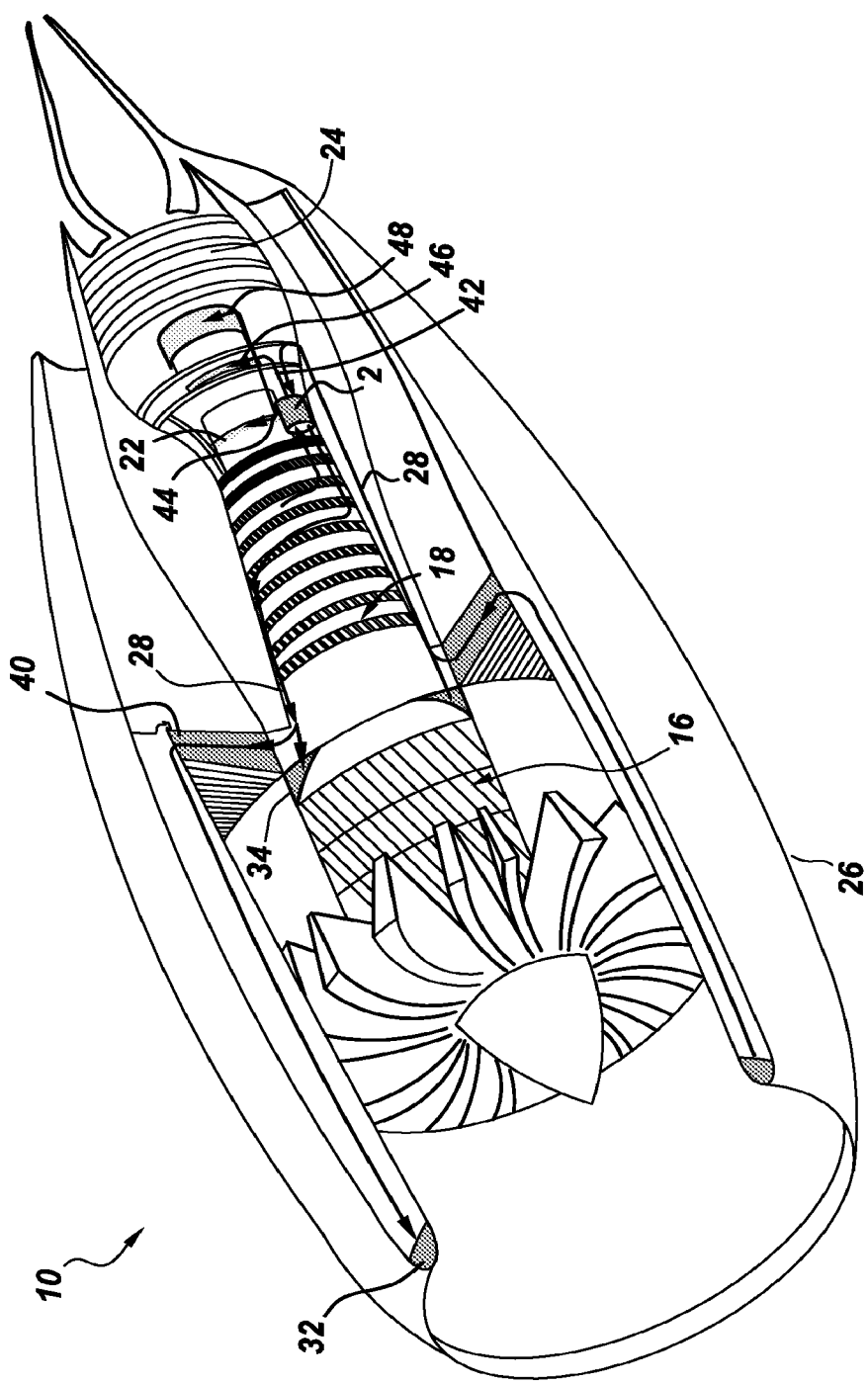
FIG. 5 is a cross-sectional illustration of an example of a cooling system for a gas turbine engine assembly according to the present technology.

The cooling systems described with respect to FIGS. 2-4b may be used singly, or in any combination. For example, as shown in FIG. 5, a cooling system for a gas turbine engine assembly 10 may include cooling fluid 28 that is provided to a heat exchanger, or evaporator, 2 by a pump. Compressor bleed air 12 is cooled by the cooling fluid 28 in the heat exchanger 2 and the cooled compressor bleed air 42 may be provided to the high pressure compressor 18, the high pressure turbine 22, and the low pressure turbine 24. A first portion 44 of the cooled compressor bleed air 42 may be provided to the high pressure compressor 18, a second portion 46 may be provided to the high pressure turbine 22, and a third portion 48 may be provided to the low pressure turbine 24. The flow and temperature of the cooled compressor bleed air 42 to the high pressure compressor, the high pressure turbine, and/or the low pressure turbine 24 may be regulated, for example by valves under the control of a processor. It should be appreciated that the cooled cooling air (i.e. compressor bleed air) may be provided to other hot parts of the gas turbine engine, for example the high pressure turbine disk, the high pressure turbine blades, and/or the high pressure compressor rear cone.

The cooling fluid 28 out of the heat exchanger 2 may be provided to the outlet guide vanes 40, the booster air inlet 34, and/or the nacelle air inlet 32 to condense the cooling fluid 28, in the case of a cooling fluid that changes phase, or cool the cooling fluid 28 in the case of a cooling fluid that does not change phase. As shown in FIG. 5, the cooling fluid 28 from the heat exchanger 2 may be divided at the outlet guide vanes 40 and the booster air inlet 34 and a further portion may be divided from the outlet guide vanes 40 to the nacelle air inlet 32. The cooling fluid 28 from the nacelle air inlet 32 may be rejoined to the cooling fluid from the outlet guide vanes 40 and further rejoined to the cooling fluid from the booster air inlet 34 prior to being returned to the heat exchanger 2. The flow of the cooling fluid to the nacelle air inlet 32, the booster air inlet 34, and/or the outlet guide vanes may be regulated by, for example, valves under the control of a processor, for example the processor that regulates the portions of the cooled compressor bleed air 42 to the high pressure compressor, the high pressure turbine, and/or the low pressure turbine.

Figure 6:
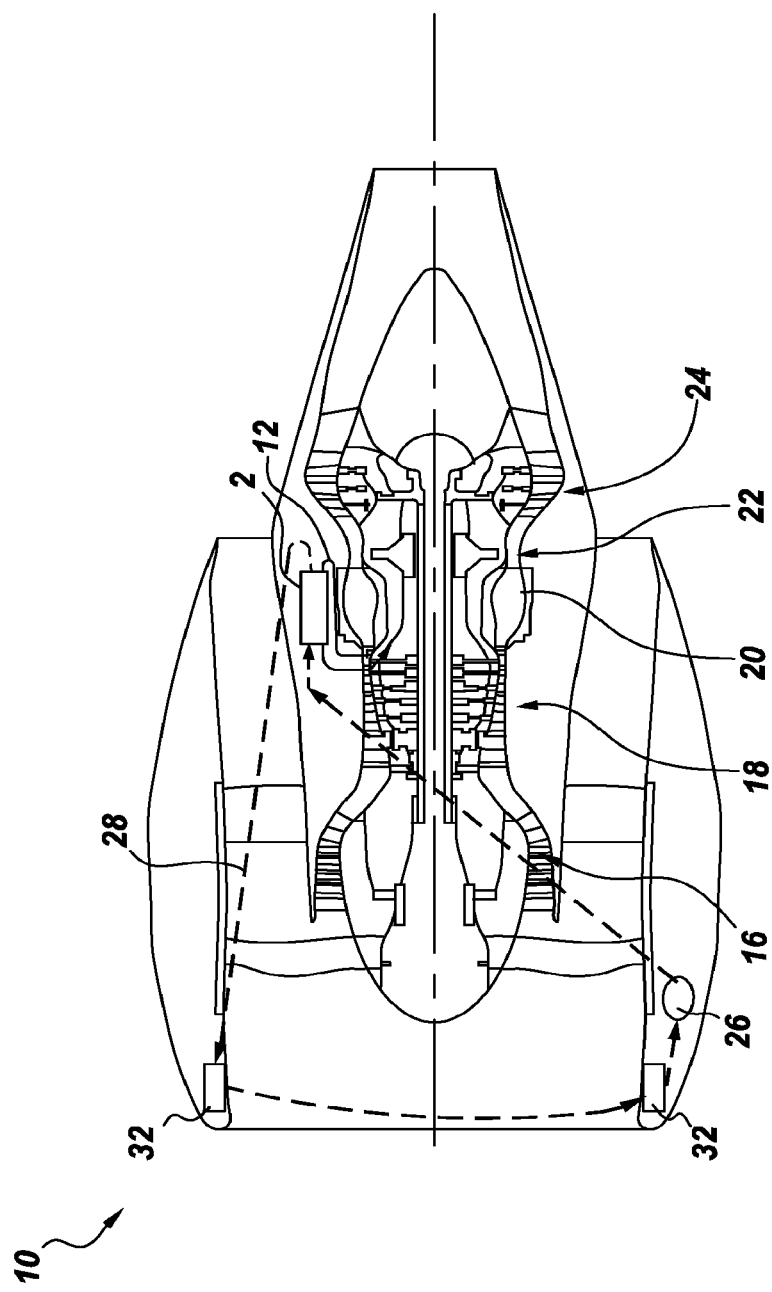
FIG. 6 is a cross-sectional illustration of an example of a cooling system for a gas turbine engine assembly according to the present technology.

Referring to FIG. 6, according to another example of the present technology, the compressor bleed air 12 may be cooled by cooling fluid 28 provided to the heat exchanger 2 and the cooled cooling air may be provided to the gas turbine engine assembly at the final stages of the high pressure compressor 18.

Figure 7:
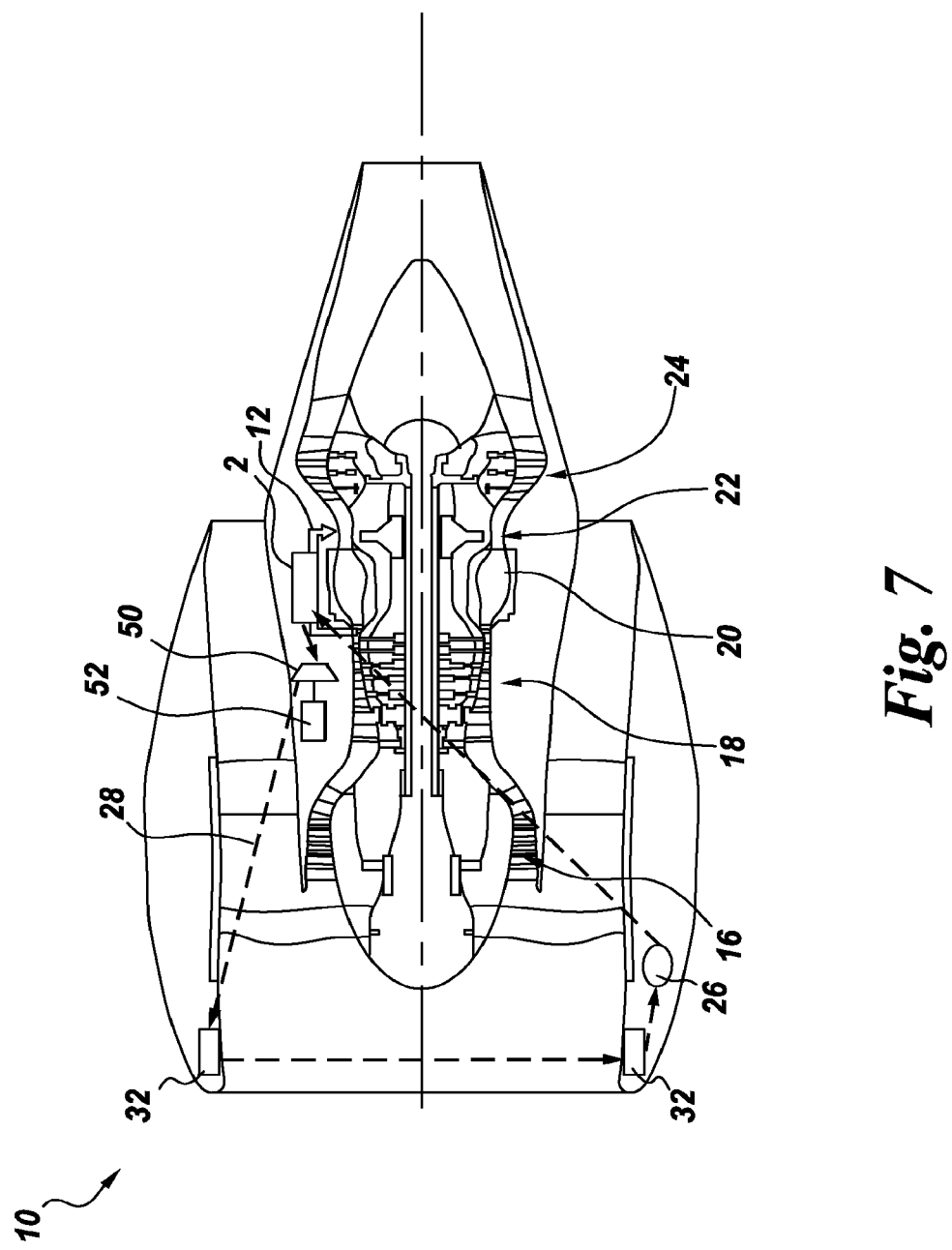
FIG. 7 is a cross-sectional illustration of an example of a cooling system with optional power generation for a gas turbine engine assembly according to the present technology.

Referring to FIG. 7, according to another example of the present technology, the cooling fluid 28 may be provided to a turbine 50 connected to an electrical generator 52 to provide for additional power generation on the aircraft.

Figure 8:
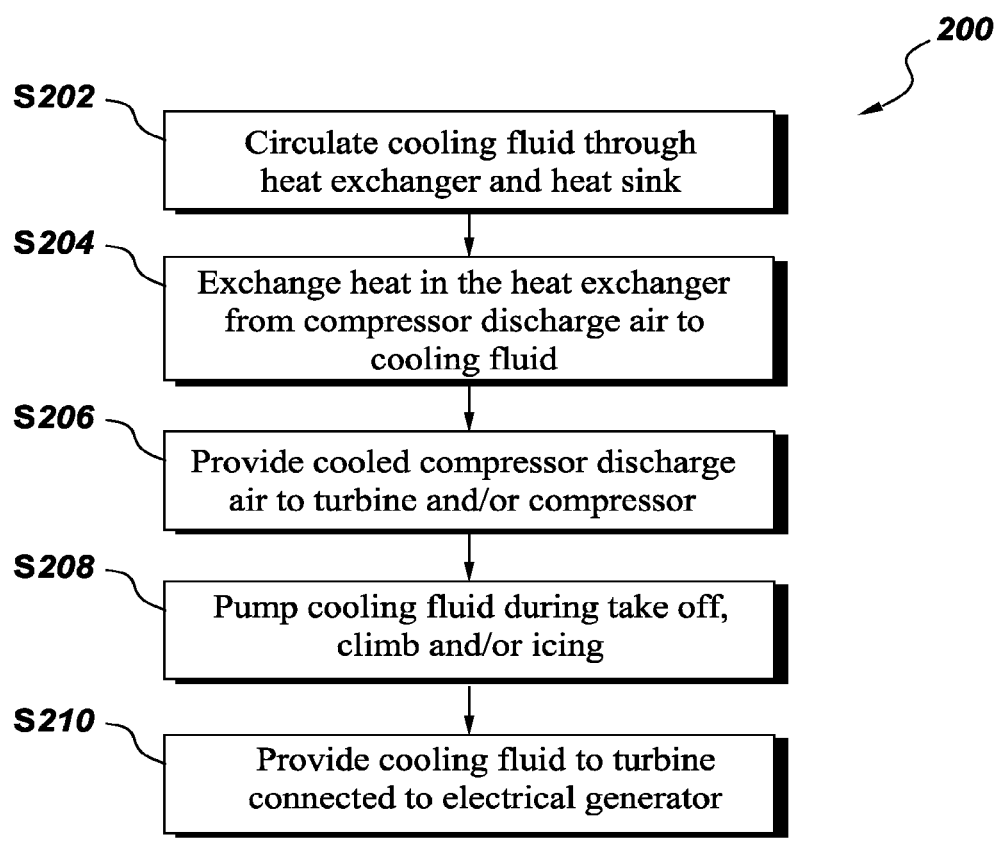
FIG. 8 schematically illustrates a method of cooling compressor discharge air provided to a turbine of a gas turbine engine of an aircraft.
Figure 9:
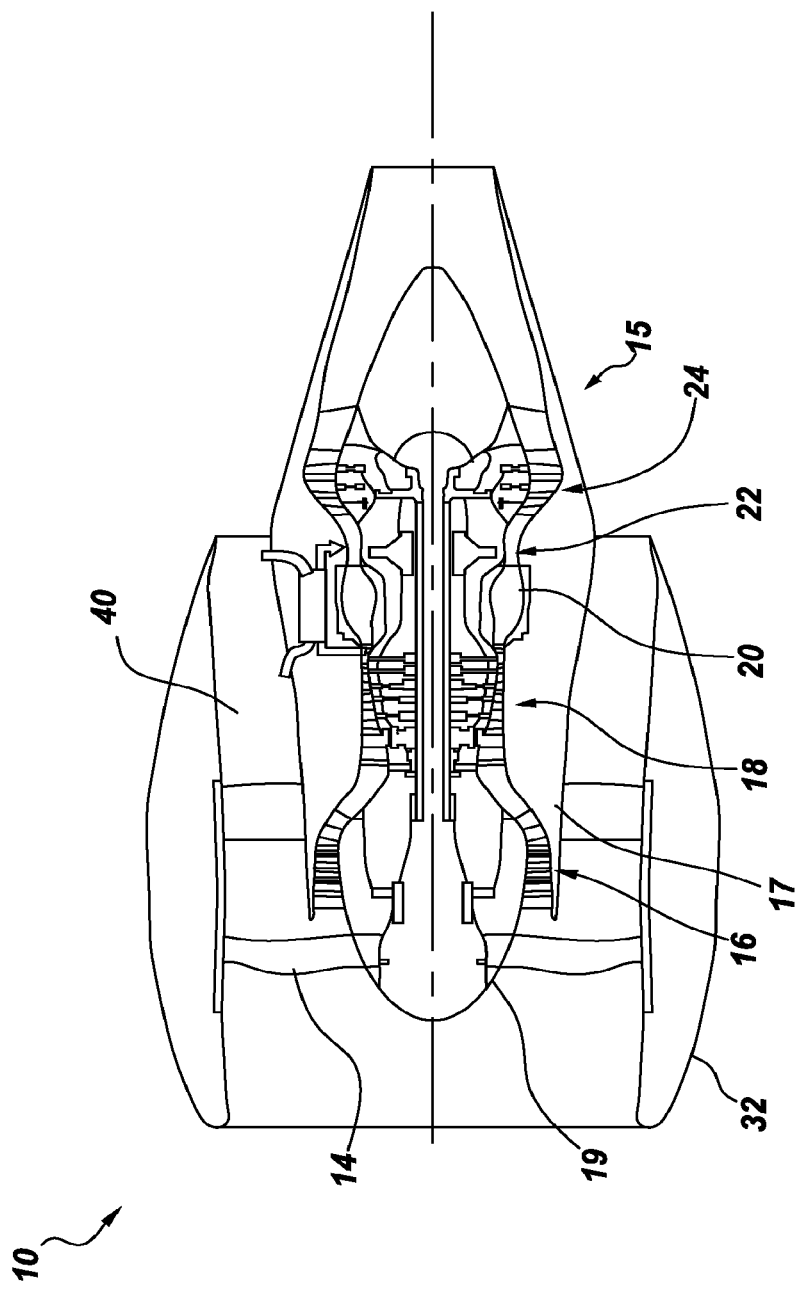
FIG. 9 is a cross-sectional illustration of a conventional gas turbine engine assembly.

Referring to FIG. 8, a method of cooling compressor discharge air provided to a turbine of a gas turbine engine of an aircraft having a compressor including a compressor booster, a turbine, and a nacelle, to cool the turbine comprises circulating a cooling fluid through a heat exchanger and a heat sink, wherein the heat sink is at least one of an inlet of a compartment of the nacelle, an inlet of the compressor booster, the nacelle internal fixed structure (IFS), the nacelle aft core cowl (ACC), the thrust reverser outer fixed structure (OFS), the nacelle external cowl or outlet guide vanes of the gas turbine engine S202; and exchanging heat in the heat exchanger from the compressor discharge air to the cooling fluid to cool the compressor discharge air S204. The method may also include providing the cooled compressor discharge air to at least one of a high pressure turbine of the turbine, a high pressure compressor of the compressor, or a low pressure turbine of the turbine S206. The method may further include pumping the cooling fluid during at least one of take-off of the aircraft, climb of the aircraft, or icing of the nacelle compartment inlet or compressor booster inlet S208 and providing at least a portion of the cooling fluid heated by the heat exchanger to rotate a second turbine connected to an electrical generator S210.

The cooled cooling air systems described herein may be used as, for example, nacelle and/or booster anti-icing system(s). This allows the aircraft to be operated without a traditional anti-icing system(s), while not adding any extra drag to the propulsion system, and providing weight savings. As the heat is dumped to a cold sink with no additional heat exchanger, the fan air does not require any heat exchanger and there is no additional drag in the propulsion system.

Furthermore, as the cooled cooling air systems described herein use an intermediate fluid, rather than air, to transport heat from the compressor bleed pipes to the cold sink, the size of the heat exchanger may be reduced which permits the heat exchanger to be packaged in the nacelle core compartment. As fuel is not used as a heat sink, the fuel can still be used to cool oil in the FCOC and there is no need for a deoxygenator in the fuel system.

The use of the outlet guide vanes, the nacelle internal fixed structure (IFS), the nacelle aft core cowl (ACC), the thrust reverser outer fixed structure (OFS), the nacelle external cowl as a condenser provides heat to the fan duct air which provides extra thrust with no additional aerodynamic drag.

The cooled cooling air systems described herein reduce the amount of air flow used by the secondary air system used for turbine cooling during cruise conditions and therefore provide a decrease in specific fuel consumption of the aircraft. As the primary air in the core of the gas turbine engine assembly and the secondary air flow in the engine bypass are not disturbed by the cooled cooling air systems described herein, no additional aerodynamic drag is created. The secondary air system may also be designed for cruise conditions, i.e. it does not have to be overdesigned, and the cost and weight of the cooling pipes may be reduced. The air mass flow rate in the secondary air system used for turbine cooling may also be reduced, which improves the efficiency of the thermodynamic cycle and the propulsion efficiency.

While only certain features of the present technology have been illustrated and described herein, many modifications and changes will occur to those skilled in the art. It is, therefore, to be understood that the appended claims are intended to cover all such modifications and changes.

What is claimed is:

1. In an aircraft including a gas turbine engine having a compressor including a compressor booster, a turbine, and a nacelle, a system for cooling compressor discharge air provided to the turbine to cool the turbine, the system comprising:
    a heat exchanger provided in a nacelle compartment of the gas turbine engine configured to cool the compressor discharge air by exchanging heat from the compressor discharge air to a cooling fluid; and
    a cooling fluid circuit configured to circulate cooling fluid through the heat exchanger and a heat sink, wherein the heat sink includes one or more outlet guide vanes of the gas turbine engine and also includes at least one of a nacelle aft core cowl, a nacelle external cowl, a thrust reverser outer fixed structure, or one or more other surfaces exposed to a bypass duct.

2. A system according to claim 1, wherein at least a portion of the cooled compressor discharge air is provided to a high pressure compressor of the compressor.

3. A system according to claim 1, wherein at least a portion of the cooled compressor discharge air is provided to at least one of a disk of the high pressure turbine or blades of the high pressure turbine.

4. A system according to claim 2, wherein another portion of the cooled compressor discharge air is provided to a rear cone of the high pressure compressor.

5. A system according to claim 1, further comprising:
    a pump configured to pump the cooling fluid, wherein the pump is configured to pump the cooling fluid during at least one of take-off of the aircraft, climb of the aircraft, or icing of the nacelle compartment inlet or compressor booster inlet, and to not pump the cooling fluid during cruise of the aircraft.

6. A system according to claim 1, wherein the cooling fluid is polyalphaolefin or water with glycol or ammonia.

7. A system according to claim 1, further comprising:
    a second turbine provided in the nacelle compartment; and
    a generator connected to the second turbine configured to generate electrical power, wherein at least a portion of the cooling fluid heated by the heat exchanger is provided to rotate the second turbine.

8. A system according to claim 7, wherein the cooling fluid undergoes a phase change when heated by the heat exchanger.

9. A system according to claim 1, wherein the cooling fluid does not undergo a phase change when heated by the heat exchanger.

10. A method of cooling compressor discharge air provided to a turbine of a gas turbine engine of an aircraft having a compressor including a compressor booster, a turbine, and a nacelle, to cool the turbine, the method of cooling the compressor discharge air comprising:
    circulating a cooling fluid through a heat exchanger and a heat sink, wherein the heat sink includes at least one of a nacelle aft core cowl or a thrust reverser outer fixed structure; and
    exchanging heat in the heat exchanger from the compressor discharge air to the cooling fluid to cool the compressor discharge air.

11. A method according to claim 10, further comprising:
    providing at least a portion of the cooled compressor discharge air to a high pressure compressor of the compressor.

12. A method according to claim 10, wherein another portion of the cooled compressor discharge air is provided to at least one of a disk of the high pressure turbine or blades of the high pressure turbine.

13. A method according to claim 11, wherein another portion of the cooled compressor discharge air is provided to a rear cone of the high pressure compressor.

14. A method according to claim 10, further comprising:
    pumping the cooling fluid during at least one of take-off of the aircraft, climb of the aircraft, or icing of the nacelle compartment inlet or compressor booster inlet.

15. A method according to claim 10, further comprising:
    providing at least a portion of the cooling fluid heated by the heat exchanger to rotate a second turbine connected to an electrical generator.

16. A method according to claim 15, wherein the cooling fluid undergoes a phase change when heated by the heat exchanger.

17. A method according to claim 10, wherein the cooling fluid does not undergo a phase change when heated by the heat exchanger.

18. A system according to claim 1, wherein the heat exchanger is located radially outward of the combustor.

19. In an aircraft including a gas turbine engine having a compressor including a compressor booster, a turbine, a nacelle, and a bypass duet, a system for cooling compressor discharge air provided to the turbine to cool the turbine, the system comprising: a heat exchanger provided in a nacelle compartment of the gas turbine engine configured to cool the compressor discharge air by exchanging heat from the compressor discharge air to a cooling fluid; and a cooling fluid circuit configured to circulate cooling fluid through the heat exchanger and a heat sink, wherein the heat sink includes at least one of a nacelle aft core cowl or a thrust reverser outer fixed structure.

\* \* \* \* \*